June 3, 1969
G. G. DWYER
3,447,446
METHOD OF AND APPARATUS FOR USE IN PROCESSING
USED CARTONS OF CORRUGATED
PAPER STOCK
Filed March 29, 1967
Sheet 1 of 2
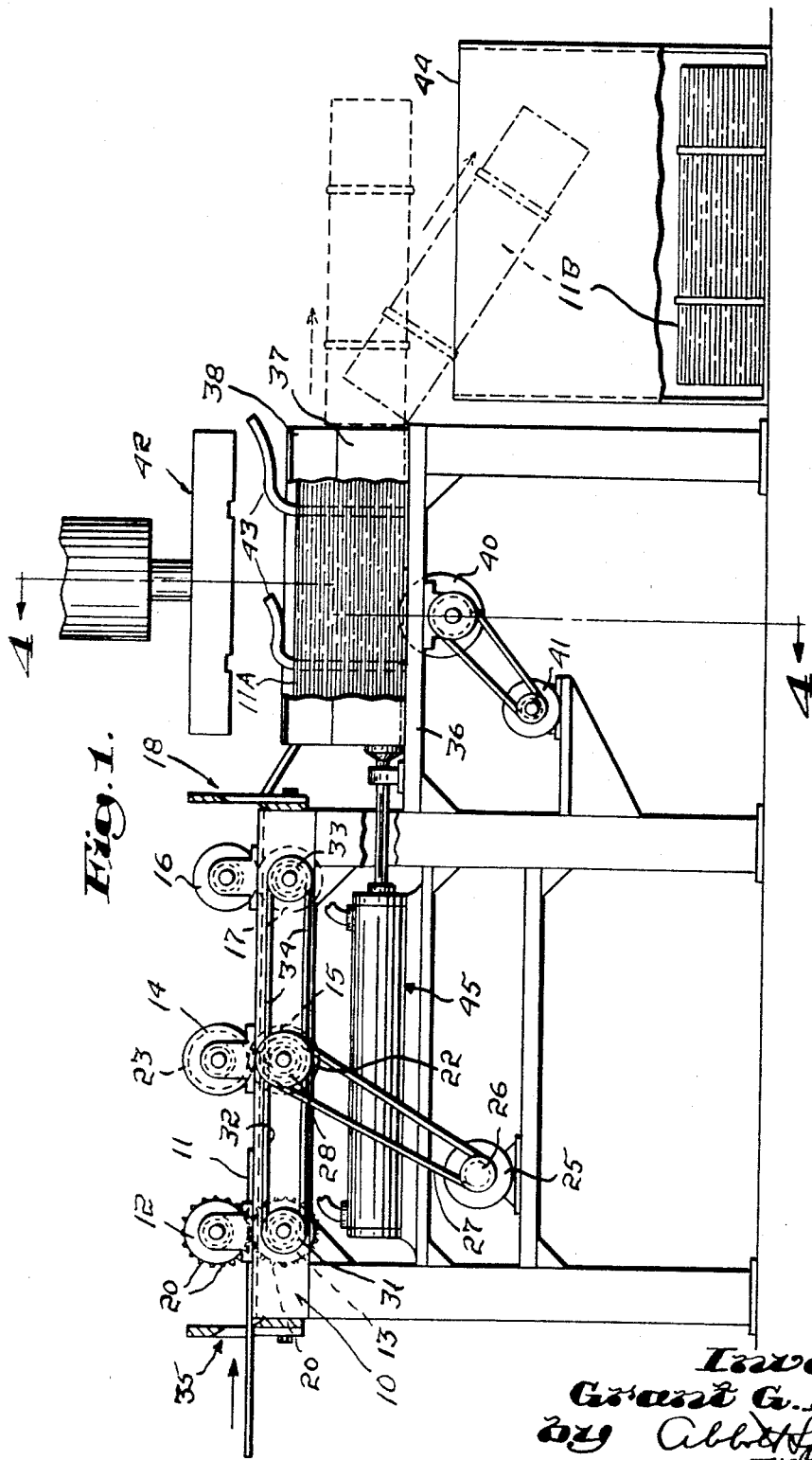

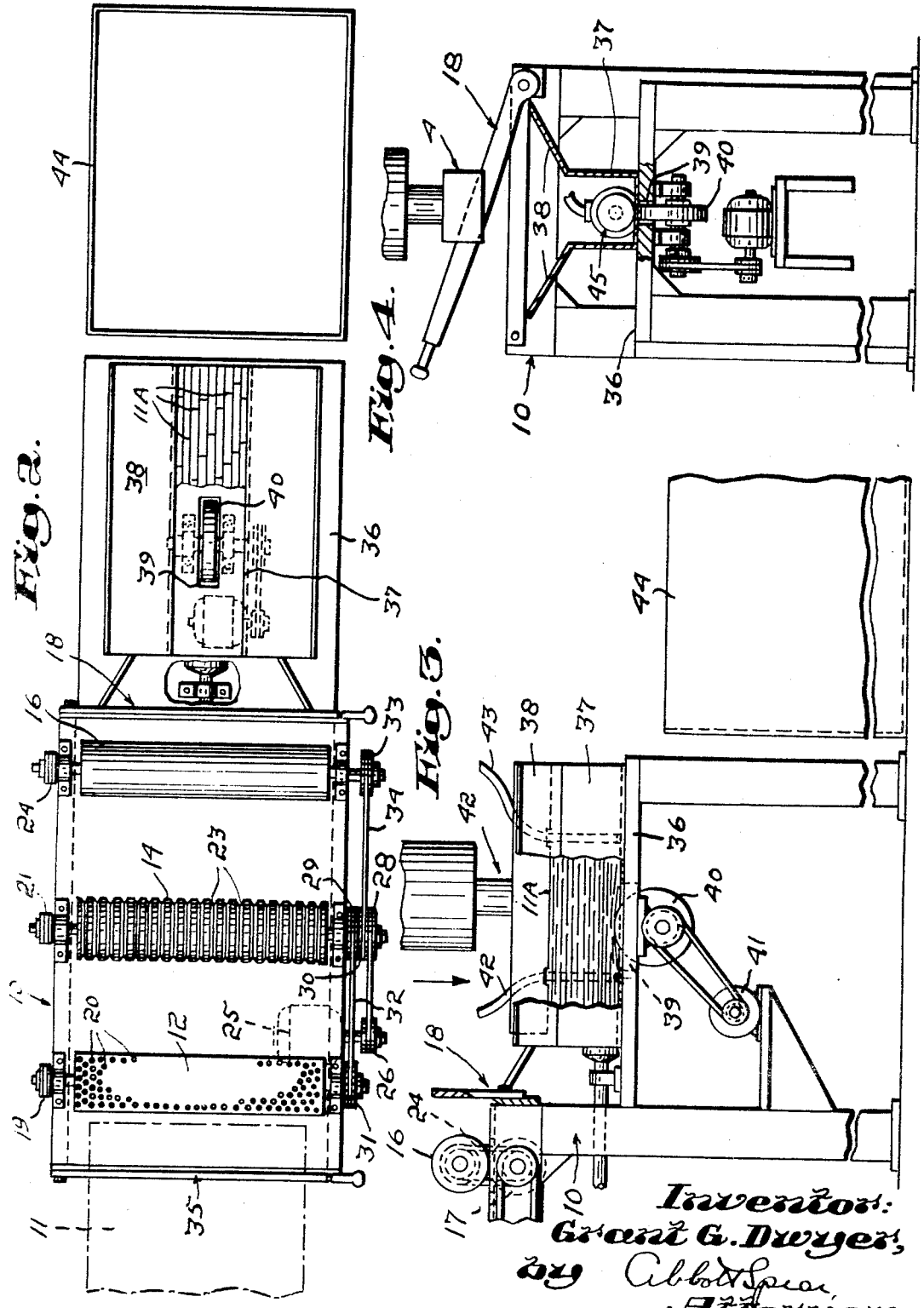

United States Patent Office 3,447,446
Patented June 3, 1969

3,447,446
METHOD OF AND APPARATUS FOR USE IN PROCESSING USED CARTONS OF CORRUGATED PAPER STOCK
Grant G. Dwyer, 10 Emerson Place,
Boston, Mass. 02114
Filed Mar. 29, 1967, Ser. No. 626,818
Int. Cl. B65b *13/02, 13/18;* B30b *13/00*
U.S. Cl. 100—3                                15 Claims

ABSTRACT OF THE DISCLOSURE

Method of processing used corrugated paper cartons with collapsed cartons cut into sections, baled in piles of dimensions convenient for rehandling and packaged in bulk for transportation, the apparatus comprising conveying means with slicers and cutters to cut the cartons into sections, a baling station, and a station where the bales are grouped for shipment.

Background of the invention

Used cartons of corrugated paper represent stock that can profitably be used at a paper mill. Many problems exist in profitably salvaging stock even where a store has large numbers of cartons of large size to be disposed of. The usual practice is to tie together loosely a number of collapsed cartons into a bundle and to truck the bundles to a baling center where the cartons are compressed into large bales. The bales are then trucked to a mill and there unbound with the stock fed to a digester in the manufacture of coarse grades of paper, boxboard, and chipboard. The bundles are large and awkward and the bales, while suitable, for transportation purposes are large and heavy. In addition, after the bales are unbound, the stock is inconvenient to handle during inspection and digester feeding operations. As a consequence, the store receives a very low price for its salvage efforts.

Many of these problems exist even if baling is done at the store, for whether collapsed cartons are formed into large or small bales, the act of baling makes the stock difficult to separate for reuse. Balers used at stores produce bales that are too small for use at the mills and each requires a number of compression strokes of the baler. As a consequence, the bales formed at a store are taken to a central station where they are opened and rebaled in larger sizes.

These generally indicated factors results in there being little, if any profit in salvaging used cartons of corrugated paper with the result that vast amounts of paper fiber that could be reclaimed are lost to the paper industry and the objectives of the present invention are to make possible both the handling of such stock on a more efficient basis and the improvement in the quality and utility of the salvaged stock. In accordance with the invention, these objectives are attained by cutting collapsed cartons, while traveling along a conveyor to a baling station, at least lengthwise with respect to the direction of their travel, into a plurality of sections, each within a predetermined width and length range. The sections are collected in a pile at the baling station and baled, the bales having approximately the same dimensions and with the sections extending generally in a direction lengthwise thereof. The bales are collected and may be combined in large bundles, if desired for convenience in storage and transportation.

Apparatus, for carrying out this procedure, comprises conveying means to convey flattened cartons, means to cut the flattened cartons while they are being conveyed into sections whose dimensions are within the predetermined length and width limits, and a baling station to receive the sections from the conveying means in a pile in which the sections extend generally lengthwise thereof. Where desired, the apparatus may include means to transfer bales from the baling station to a collecting station.

These and other features of both method and apparatus result in the attainment of the objectives to the maximum extent where the invention is practiced at a store but provides substantial advantage if practiced at a central baling station since the bales are easily handled and the salvaged corrugated paper stock is ready for use in the digesters and of a quality superior to that of the salvaged corrugated paper stock now vailable since the baling of whole cartons consistently results in foreign matter, wood, metal, glass, and damaged can goods, for example, being included in the bales.

Such other features relate to the mangling of the corrugated paper stock and the compression of the sections, the jogging of the piles to ensure that the bales are not only of approximately the same size and shape and of approximately the same weight, but also that they can be suitably compressed by a single compression stroke of the baler.

In addition, the apparatus may be automatically or manually operated and the baling station may include an automatic binder. At the collecting station, the bales may be loosely collected in a transportable container or they may be combined in a large bundle for ease and convenience in transportation and storage.

In the accompanying drawings, there is shown an embodiment of the invention illustrative of these and other of its objectives, novel features, and advantages.

In the drawings:

FIGURE 1 is a somewhat schematic side view of apparatus in accordance with the invention, FIGURE 2 is a top plan view thereof, FIGURE 3 is a fragmentary view of the apparatus illustrating the formation of a bale at the baling station, and FIGURE 4 is a section taken approximately along the indicated lines 4—4 of FIGURE 1.

In the embodiment of the invention illustrated by the drawings, a table-like support 10 is provided to receive collapsed cartons of corrugated paper, one such carton being generally indicated at 11. The collapsed cartons 11 are fed between a pair of infeed rolls 12 and 13 which convey the cartons between a pair of cutting rolls 14 and 15 to the outfeed pair of rolls 16 and 17. On the discharge side of the outfeed rolls, there is a cutter generally indicated at 18 and shown, for convenience, simply as manually operated shears.

The infeed rolls 12 and 13 are shown as interconnected by a chain drive 19 and their surfaces are provided with studs 20 by which the surfaces of the layers of corrugated paper engaged thereby will be broken to rupture the corrugations.

The cutting rolls 14 and 15 are also interconnected by a chain drive 21. The cutting roll 15 has a series of axially spaced, circular blades 22 while the roll 14 has annular grooves 23 spaced and dimensioned to receive the blades 22 without contact with their cutting edges. The cutting rolls 14 and 15 are operative to cut the collapsed carton lengthwise of their direction of travel into sections 11A of desired width. If their length exceeds a predetermined maximum, they are cut as by the shears 18 so that their length does not exceed that maximum.

The outfeed rolls 16 and 17 are interconnected by a chain drive 24 and the outfeed rolls are operative not only to discharge the sections 11A but also to compress them with entrapped air being minimized by the prior rupturing of the surfaces of the layers of corrugated paper.

A motor 25 has its driving sprocket 26 connected, as by a chain 27, to a sprocket 28 on one end of the roll 15. The roll 15 also has sprockets 29 and 30, the sprocket 29 being shown as connected to the sprocket 31 of the roll 13 by a chain 32 and the sprocket 30 being connected to the sprocket 33 of the roll 17 by a chain 34.

With the structure as thus far described, it will be apparent that collapsed cartons may be cut into sections that do not exceed predetermined lengh and width dimensions. As collapsed cartons are placed on the table 10, they are disposed to minimize contact of staples with the cutting blades 22 of the roll 15. As it may be desired to trim some collapsed cartons to remove rows of staples or embedded metal, cutting means 35 are shown at the infeed end of the table 10 and these, for convenience, are shown as manually operated shears.

Below the outfeed end of the table 10 there is a support 36 in support of a frame 37 having a chute 38 tapering laterally inwardly so that the sections 11A are collected in a relatively narrow pile. The support 36 has a slot 39 through which an eccentric 40 protrudes as it rotates thus to jog the pile as it is being formed. For convenience, the eccentric 30 is shown as driven by a motor 41.

When the jogged pile reaches a predetermined level in the frame 37, the motor 41 is stopped, and a press 42 operated to compress the pile which is then baled with straps 43 which are tied to convert the pile into a bale 11B. The press 42 may be manually or power operated. A convenient bale size is in the neighborhood of one foot by one foot by four feet.

While the bales 11B may be otherwise handled, they are shown as being transferred to a collecting station shown as a large container 44 which loosely receives the bales 11B for convenience in storage and transportation. A ram 45 is shown as operable to so push a bale 11B from its frame 37 as to cause it to drop into the container 44.

I claim:

1. The method of processing used cartons of corrugated paper stock that comprises the steps of conveying flattened cartons and, while they are being conveyed, cutting them at least lengthwise with respect to the direction of their travel, into a plurality of sections, each within a predetermined width and length range, mangling the corrugated paper stock as to rupture and vent the corrugations and thereafter compressing the mangled stock, the mangling and compressing steps being performed during the conveying step, and collecting and baling the sections to provide a series of bales, each of approximately the same dimensions and with the sections extending generally in a direction lengthwise thereof.

2. The method of claim 1 in which the mangling step precedes the cutting step and the compressing step follows the cutting step.

3. The method of claim 1 in which the collecting and baling step includes the step of collecting the sections in a pile whose width is substantially less than the width of the flattened cartons.

4. The method of claim 3 and the step of jogging each pile during its formation.

5. The method of claim 3 and the step of compressing each pile before baling it.

6. The method of processing used cartons of corrugated paper stock that comprises the steps of conveying flattened cartons and, while they are being conveyed, so mangling them as to rupture the corrugations of the stock, cutting them at least lengthwise with respect to their direction of ravel into a plurality of sections, each within a predetermined length and width range, and compressing the sections.

7. Apparatus for processing used cartons of corrugated paper stock, said apparatus comprising means to convey flattened cartons, means to mangle the cartons, means to cut the flattened cartons, while they are being conveyed, into sections whose dimensions are within predetermined maximum length and width limits, and a baling station to receive said sections from said conveying means in a pile in which the sections extend generally lengthwise thereof.

8. The apparatus of claim 7, a station wherein a plurality of bales are combined for transportation and means to transfer a bale from the baling station to the last nemed station.

9. The apparatus of claim 7 and means to compress the carton stock after it passes the cutting means, and while it is being conveyed.

10. The apparatus of claim 7 in which the conveying means includes a pair of mangling rolls and a pair of compressing rolls, and the cutting means are located between the two pairs of rolls.

11. The apparatus of claim 7 in which the baling station includes a jogger for settling the piles.

12. The apparatus of claim 7 and a chute at the outfeed end of the conveying means and above the baling station, the baling station includes a relatively narrow collecting frame under the chute, and the chute tapers transversely inwardly to discharge within the collecting frame.

13. The apparatus of claim 12 and a second station wherein a plurality of bales are combined for transportation, and means operable to shift the frame from a first position under the chute into a second position over the second station.

14. The apparatus of claim 13 and a support on which the frame rests in its first position, a press is operable to press the pile against the support, and a jogger is operable to extend upwardly through the support into engagement with the pile.

15. Apparatus for processing used cartons of corrugated paper stock, said apparatus comprising a conveyor including means to so mangle flattened cartons as to rupture the corrugations of the stock, means to cut the mangled stock, at least lengthwise with respect to the direction of its travel, into a plurality of sections, each within a predetermined length and width range, and means to compress the sections.

References Cited

UNITED STATES PATENTS

| | | | |
|---|---|---|---|
| 215,787 | 5/1879 | Belt | 100—3 |
| 252,922 | 1/1882 | Bacon. | |
| 2,327,103 | 8/1943 | Gude | 83—94 |
| 3,089,410 | 5/1963 | Stangl | 100—218 XR |

BILLY J. WILHITE, *Primary Examiner.*

U.S. Cl. X.R.

83—94; 100—7, 34, 39, 97, 218